(12) United States Patent
Dieckmann et al.

(10) Patent No.: US 9,988,105 B2
(45) Date of Patent: Jun. 5, 2018

(54) REAR SPOILER DEVICE FOR A VEHICLE (71) Applicant: WABCO Europe BVBA, Brussels (BE)

(72) Inventors: Thomas Dieckmann, Pattensen (DE); Jakob Tobias Krost, Braunschweig (DE); Josef Oleksik, Braunschweig (DE); Timo Richter, Braunschweig (DE); Gandert Marcel Rita Van Raemdonck, PW Delft (NL); Frank Zielke, Barsinghausen (DE)

(73) Assignee: WABCO Europe BVBA, Brussels (BE)

( * ) Notice: Subject to any disclaimer, the term of this patent is extended or adjusted under 35 U.S.C. 154(b) by 0 days. days.

(21) Appl. No.: 15/301,743

(22) PCT Filed: Mar. 10, 2015

(86) PCT No.: PCT/EP2015/000527
§ 371 (c)(1),
(2) Date: Oct. 4, 2016

(87) PCT Pub. No.: WO2015/154842
PCT Pub. Date: Oct. 15, 2015

(65) Prior Publication Data
US 2017/0021873 A1    Jan. 26, 2017

(30) Foreign Application Priority Data
Apr. 11, 2014  (DE) .................. 10 2014 005 374

(51) Int. Cl.
B62D 35/00    (2006.01)
B62D 37/02    (2006.01)

(52) U.S. Cl.
CPC ......... B62D 35/001 (2013.01); B62D 35/007 (2013.01); B62D 37/02 (2013.01)

(58) Field of Classification Search
CPC ..... B62D 35/001; B62D 35/007; B62D 37/02
(Continued)

(56) References Cited

U.S. PATENT DOCUMENTS 6,799,791 B2 * 10/2004 Reiman ................ B62D 35/004
                                                     296/180.1
8,235,456 B2 *  8/2012 Nusbaum ............. B62D 35/001
                                                     296/180.1

FOREIGN PATENT DOCUMENTS

CA      2361224 A1    5/2003
DE     10228658 A1    1/2004
(Continued)

OTHER PUBLICATIONS

European Patent Office, Rijswijk, Netherlands, International Search Report of International Application No. PCT/EP2015/000527, dated May 28, 2015, 2 pages.

Primary Examiner — Joseph D. Pape
Assistant Examiner — Dana D Ivey
(74) Attorney, Agent, or Firm — Brinks Gilson & Lione (57) ABSTRACT A rear spoiler device for a vehicle with at least one rear door has a side air guiding element which can be adjusted between a retracted basic position and a travel position for contour extension and aerodynamic air guiding, a roof air guiding element which can be adjusted between a basic position and a travel position for contour extension and aerodynamic air guiding, and a coupling device for coupling the adjustment movements of the side air guiding element and the roof air guiding element. The coupling device is provided between a lower side of the roof air guiding element and an upper end of the side air guiding element. The upper end of the side air guiding element can be adjusted along the lower side of the roof air guiding element during the adjustment movement.

18 Claims, 6 Drawing Sheets (58) Field of Classification Search
USPC .................................................... 296/180.4
See application file for complete search history.

(56) References Cited

FOREIGN PATENT DOCUMENTS

| | | |
|---|---|---|
| DE | 202009015009 U1 | 1/2010 |
| DE | 202009014476 U1 | 2/2010 |
| DE | 202009014510 U1 | 2/2010 |

\* cited by examiner

REAR SPOILER DEVICE FOR A VEHICLE

TECHNICAL FIELD

The invention relates to a rear spoiler device for a vehicle, in particular a utility vehicle, for example, a lorry, wherein the vehicle has at least one rear door, in particular two rear doors. The rear spoiler device is in particular suitable for a vehicle having a substantially box-like structure or side walls, roof and rear doors which terminate them at the rear at right angles.

BACKGROUND

U.S. Pat. No. 6,799,791 B2 sets out such a rear spoiler device. It has air guiding elements for contour extension and aerodynamic air guiding which extend the side walls and the roof toward the rear in a travel position, in particular with an inward extent for cross-section reduction. In the basic position, the rear spoiler device is retracted. In this instance, a folding mechanism is provided in order to fold the plurality of faces into each other in the basic position; the folding operation is carried out by means of a rod assembly which is intended to be manually operated by a user with a crank handle. The two side air guiding elements are articulated in laterally outer regions of the rear; the roof air guiding element is accordingly articulated to an upper end of the rear so that the air guiding elements can each retract or fold inward and fold open outward. They are coupled to each other by means of a connection portion which enables folding during the retraction operation.

The connection of the air guiding elements is consequently carried out in the hinge region of the rear doors. Such connections are, however, generally complex and sometimes require special hinge constructions. When the rear doors are pivoted open forward through 270°, such connections of the air guiding elements are disadvantageous since they can impair the pivoting-open operation, wherein the structural space in the hinge region is limited in any case.

DE 102 28 658 A1 sets out folding solutions in which planar faces which can pivot via a hinge in the travel region are intended to enable aerodynamic optimization.

German utility models DE 20 2009 014 476 U1, DE 20 2009 014 510 U1 and DE 20 2009 015 009 U1 set out rear spoiler devices in which air guiding elements are displaceably or pivotably arranged in order to enable unimpaired opening of the rear doors.

Such systems are often difficult to operate for the user, in particular with operating rod assemblies such as crank handles, etcetera. The additional handling devices increase the overall weight and the costs. The adjustment can lead to jamming; the adjustment movements may also not be clearly defined and consequently lead to wobbling, which is disruptive for the user, or an imprecise adjustment movement.

SUMMARY OF THE INVENTION

An object of the invention is to provide a rear spoiler device which can be constructed with relatively little complexity and which enables a reliable adjustment between the travel position and return position.

A coupling device is provided, which couples the adjustment movement of the side air guiding element and the roof air guiding element. The coupling is advantageously constructed between a lower side or lower face of the roof air guiding element and an upper end region or upper end of the side air guiding element. Advantageously, a coupling element of the side air guiding element slides or extends on the lower side of the roof air guiding element.

There is consequently no folding with folding lines as in U.S. Pat. No. 6,799,791 B2 and advantageously no equal coupling between the side air guiding element and the roof air guiding element, but instead the roof air guiding element is adjusted by the side air guiding element by the upper end of the side air guiding element sliding along or extending along the lower side of the roof air guiding element. In this instance, the upper side of the side air guiding element, advantageously a coupling element on the upper side, describes a curved path or a curved contour at the lower side of the roof air guiding element.

The coupling device may be constructed as a pressure-resistant and/or tension-resistant coupling, for example, a positive-locking engagement. To this end, for example, a rail guide may be provided so that a coupling element which is provided at the upper side or in an upper region of the side air guiding element slides in the rail of the lower side of the roof air guiding element. The pressure- and tension-resistant construction enables secure coupling which also ensures a secure connection in both end positions. Consequently, wobbling or greater friction losses during the adjustment can also be reduced or prevented.

As an alternative to such a rail system, direct support of the roof air guiding element on the side air guiding element is also possible so that a coupling which is supported by gravitational force and which is preferably also resiliently loaded is present: during the installation operation from the basic position into the travel position, the roof air guiding element is pivoted upward counter to gravitational force, where applicable in addition counter to a resilient force; during the return movement, it follows the side air guiding element by pivoting downward in a state supported by gravitational force, wherein in addition a resilient force advantageously acts in a downward direction.

The pressure-resistant and tension-resistant coupling and the resilient pretensioning in particular serve to reduce or prevent a wobbling and vibration and oscillations, and also to prevent an adjustment as a result of travel wind.

The side air guiding element is adjusted by an adjustment device which advantageously ensures a forced guiding or clear guiding so that no unnecessary degrees of freedom make use more difficult and lead to imprecise positions with respect to the roof air guiding element. Advantageously, there is not simply produced a folding movement about an axis in the hinge region of the door, but instead a pivot movement with the front end of the roof air guiding element being adjusted. A four-bar coupling with four articulation axes which are parallel with each other and offset with respect to each other is particularly advantageous. The four-bar coupling may in particular be carried out by means of a main rocker arm having a relatively great length or relatively large spacing between the axes thereof and one or more auxiliary rocker arms. Consequently, a pivot operation from a travel position in which the side air guiding element is positioned flat on the rear door may be enabled forward and backward into the travel position. Such a pivot movement also in particular enables the front end of the side air guiding element to reach the side wall or a side face of the vehicle structure so that there is a flush termination at this location. The hinge region of the rear door is thereby not loaded with additional applications or connections; the pivot operation can be carried out by the user in a simple manner and can be achieved with little complexity and allows precisely adjustable positions of the basic position and the travel position.

This results in additional advantages:

The four-bar coupling enables a pivot movement of the side air guiding element, which leads to a great curve length of the circular track between the coupling element of the side air guiding element and the lower side of the roof air guiding element. A high force reduction and consequently an installation operation which requires uniform and low force is achieved for the roof air guiding element, in particular in comparison with a side air guiding element which is articulated to the rear door only at the front end thereof and which folds open.

The entire rear spoiler device may be provided on the rear door. Advantageously, in the basic position thereof, it can be placed completely flat on the rear door so that the rear door can be pivoted forward through 270° after opening and the rear spoiler device which is folded in can be received completely between the rear door and the side wall, wherein the rear door can in this instance be locked to the side wall.

The rear spoiler device may be provided on each of two pivotable rear doors separately and independently of each other. It consequently enables selective access to one of the rear doors, without the rear spoiler device of the other rear door first having to be folded into the basic position.

In addition, there may be provided resilient actions which support the forced guiding. The resilient loading of the side air guiding element may thus be constructed in a bi-stable manner, and consequently be pretensioned into the basic position and the travel position in each case. The user consequently presses the air guiding element starting from the basic position firstly in a first pivot region counter to the resilient action as far as an intermediate dead center position from which in a second region an independent or at least resiliently supported pivoting-open operation is carried out into the travel position and vice versa back from the travel position into the basic position. Errors in the adjustment can thereby be prevented and the operation facilitated.

Furthermore, a rear spoiler arrangement of two such rear spoiler devices is provided for a rear region of a vehicle with two rear doors, and a vehicle which enables secure adjustment of the two rear spoiler devices thereof from the basic position into the travel position and, furthermore, selective access to the rear doors and a folding forward of the rear doors in a forward direction for abutment against the side wall without the rear spoiler devices having a disruptive effect in this instance. The travel position is solid and reinforced per se, for example, by means of the coupling device and the rocker arms which have a stabilizing effect and which advantageously ensure the formation of a triangle and consequently a high level of stability.

The basic position and the travel position may additionally be locked, for example, by means of locking devices for locking a lateral rocker arm to the rear door, where applicable also in addition locking the roof air guiding element, which has, however, also already been locked by the coupling device.

The invention is explained in greater detail below with reference to the appended drawings of some embodiments. The drawings are provided for purely illustrative purposes and are not intended to limit the scope of the invention.

DETAILED DESCRIPTION OF THE DRAWINGS

Figure 1:
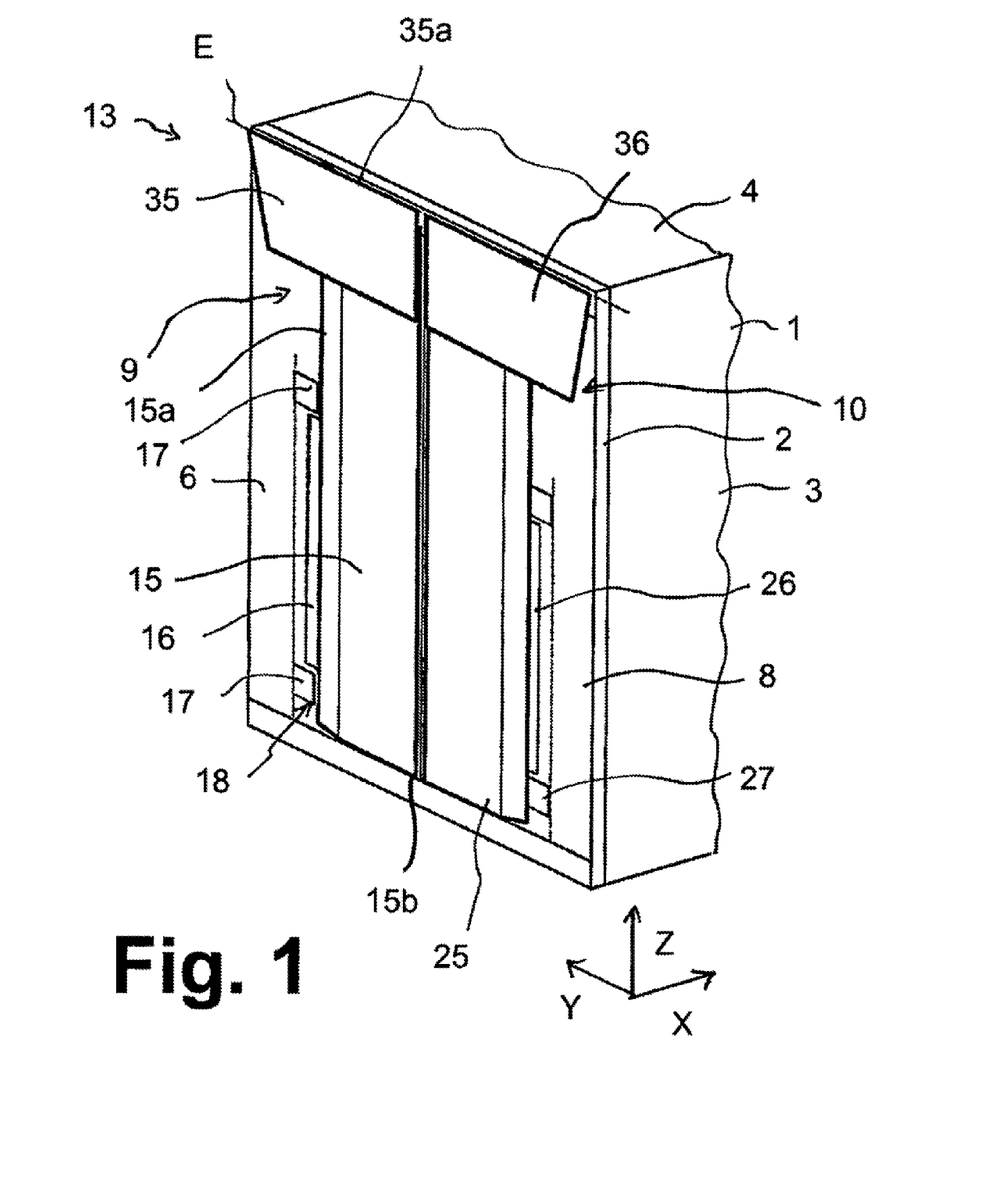
FIG. 1 shows a rear region of a vehicle having a rear spoiler device according to an embodiment of the invention in the basic position.
Figure 2:
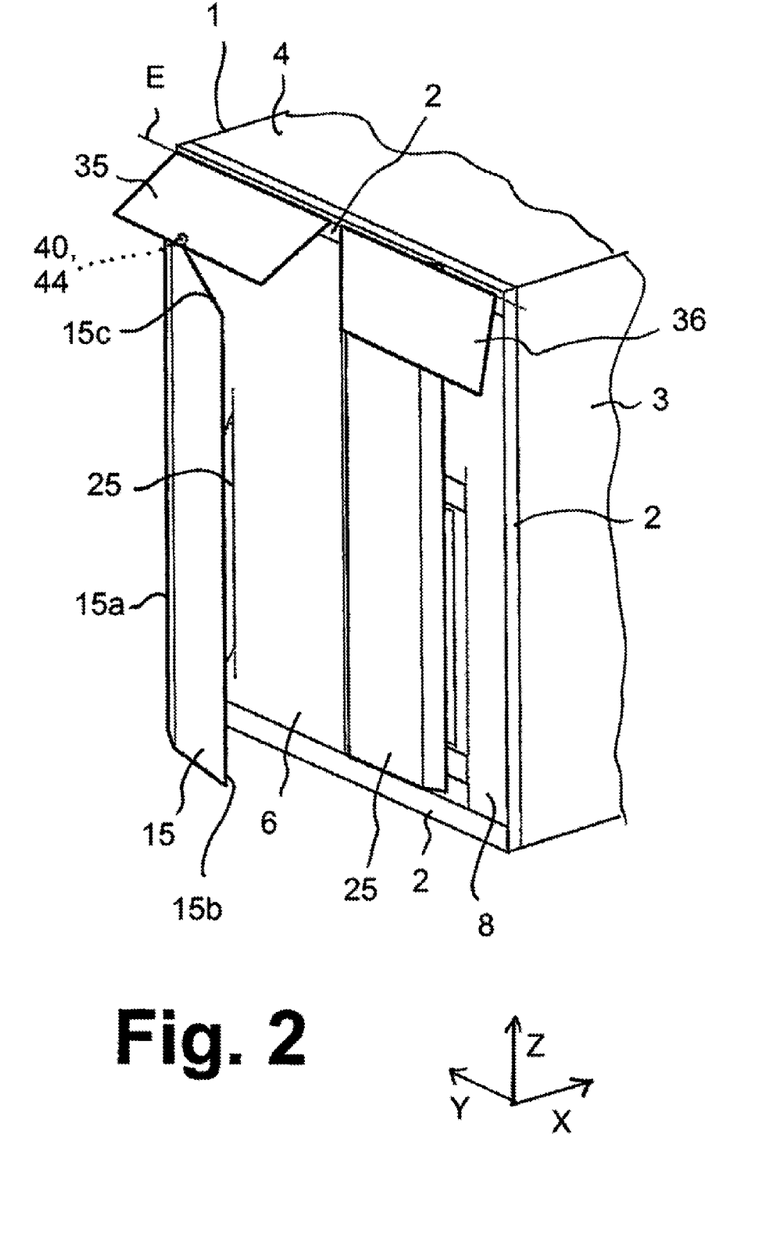
FIG. 2 shows a first intermediate step for installing the left rear spoiler device.
Figure 3:
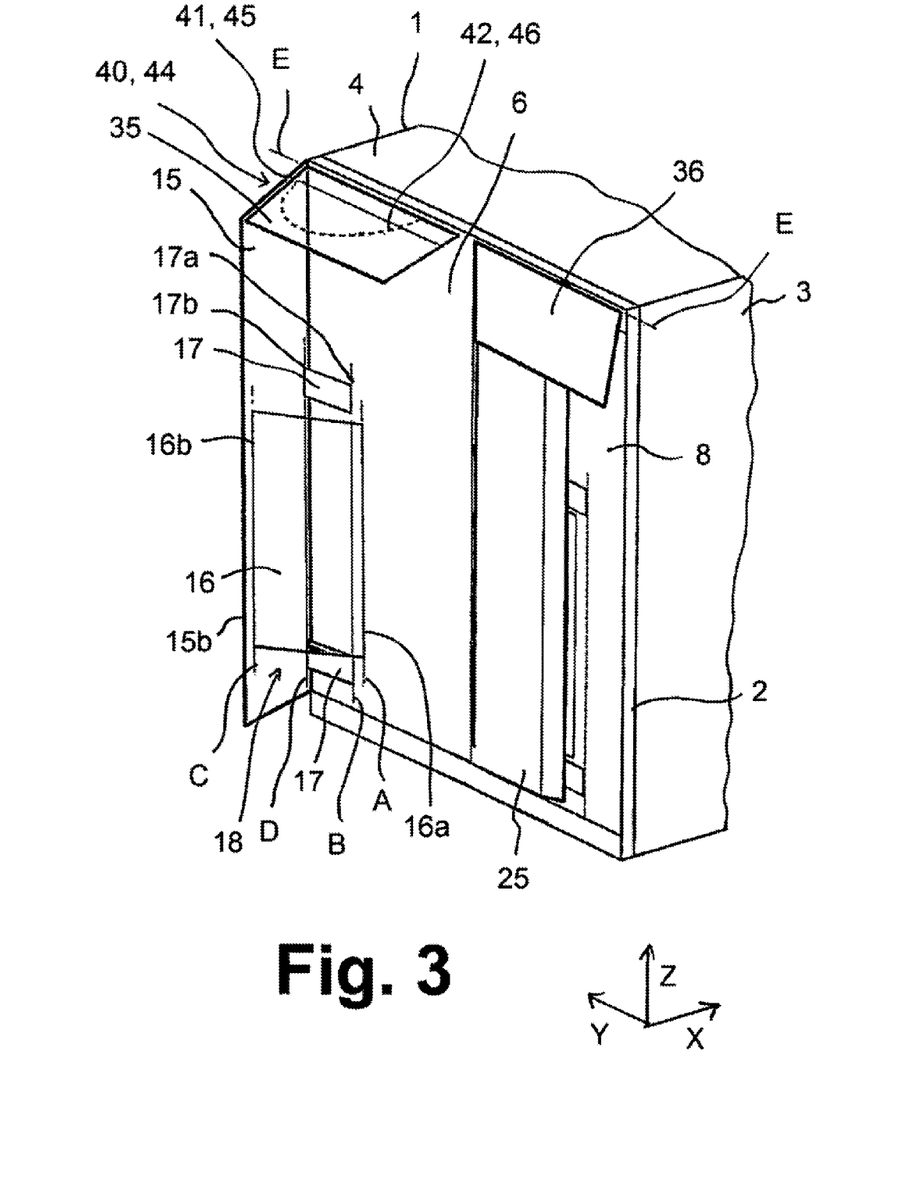
FIG. 3 shows the left rear spoiler device in the travel position.
Figure 4:
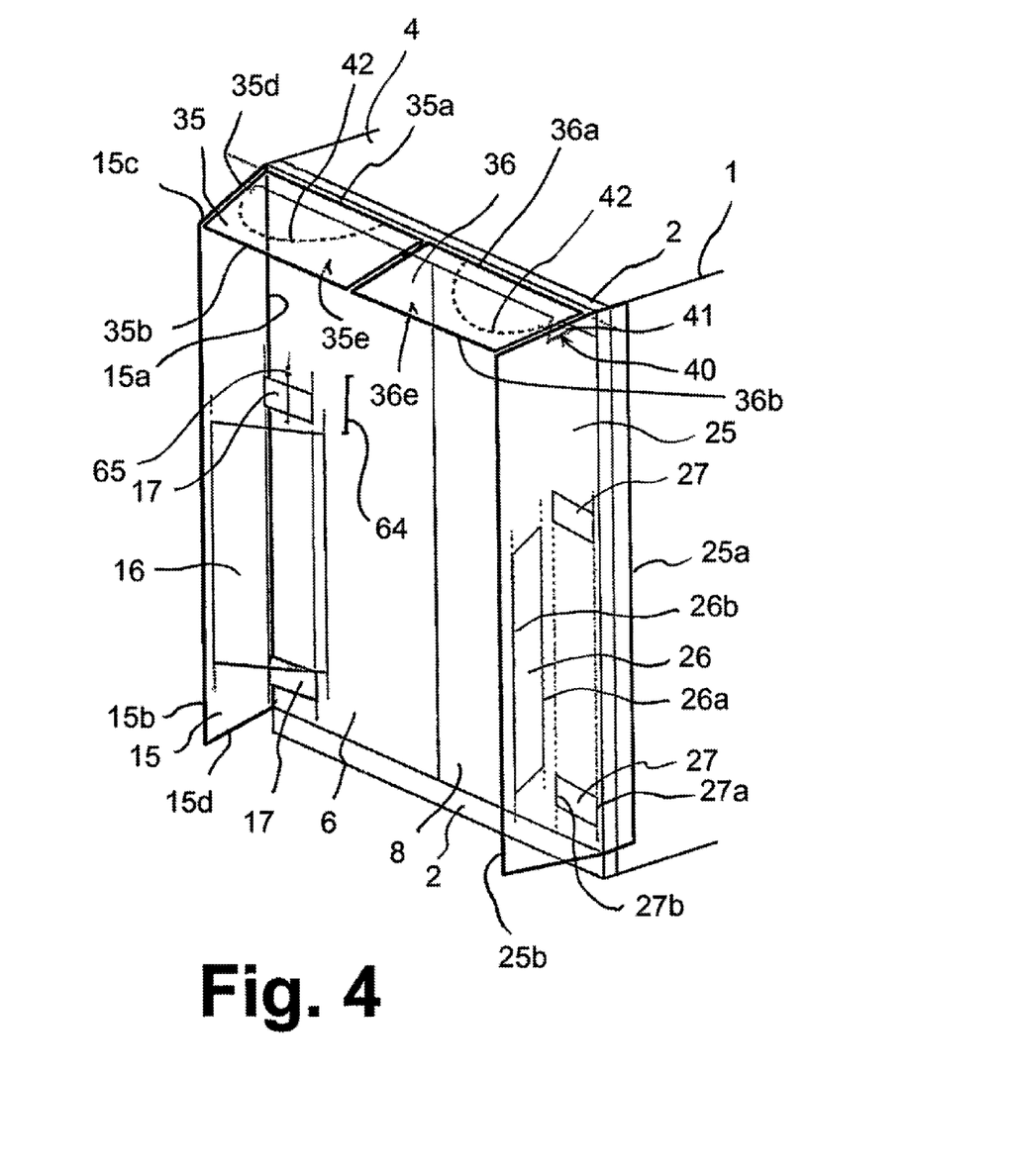
FIG. 4 shows the complete travel position of a first embodiment with a tension-resistant and pressure-resistant coupling device.
Figure 6:
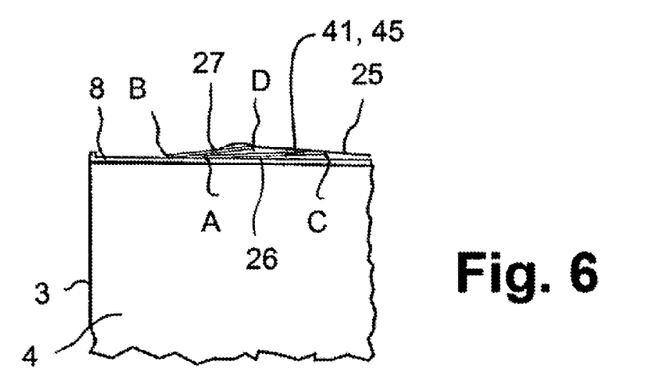
FIGS. 6 to 8 are plan views of the right rear door without a roof air guiding element in sequential adjustment positions.
Figure 7:
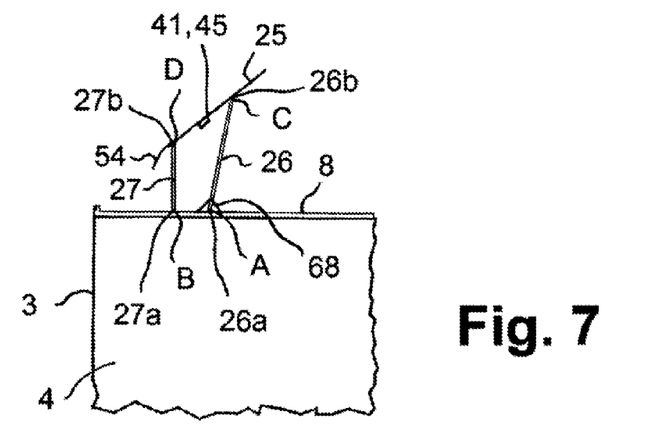
Figure 8:
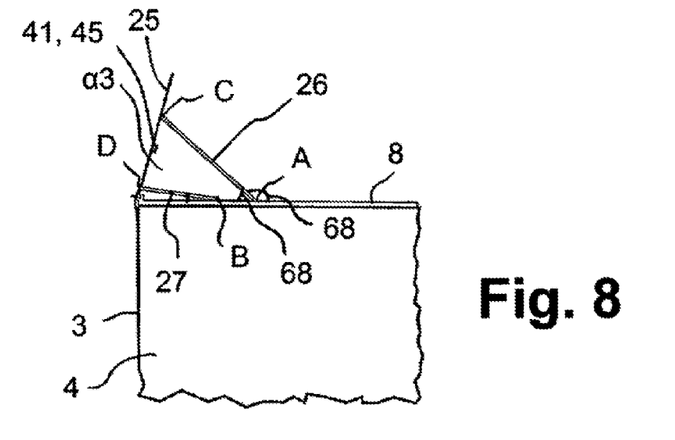

According to FIG. 1, a vehicle 1, in particular a utility vehicle, such as, for example, a lorry, is shown with the rear region thereof. The vehicle 1 has a vehicle structure 2 which is illustrated in particular as a vehicle frame or rear vehicle portal, side walls 3, a roof 4 and a left (in the travel direction) rear door 6 and a right rear door 8. There is secured to the left rear door 6 a left rear spoiler device 9 whose adjustment is shown in FIGS. 1 to 3. Accordingly, there is fitted to the right rear door 8 a right rear spoiler device 10 which in FIGS. 1 to 3 is initially in the basic position and which is shown in FIG. 4 in the pivoted-out travel position, wherein FIGS. 6 to 8 show the adjustment in a plan view. Both rear spoiler devices 9 and 10 are fitted only to the respective rear door 6 or 8 and are provided in accordance with the pivot direction of the rear door 6 or 8 in a mirror-symmetrical manner with respect to each other, respectively. Both rear spoiler devices 9 and 10 together form a rear spoiler arrangement 13.

The left rear spoiler device 9 and the right rear spoiler device 10 can each be manually adjusted independently of each other and by a user. The left rear spoiler device 9 has a left side air guiding element 15, a main rocker arm 16 and two auxiliary rocker arms 17. The main rocker arm 16 and the two auxiliary rocker arms 17 are each articulated between the left rear door 6 and the side air guiding element 15. The main rocker arm 16 is consequently articulated with one end in a front link 16a in an articulation axis A to the left rear door 6 in order articulated with the other end thereof by means of a rear link 16b in an articulation axis C to the left side air guiding element 15. As can be seen in FIG. 3, the rear articulation axis C may be in abutment close to the rear end of the side air guiding element 15 in order to achieve a high level of stabilization and to effectively prevent a wobbling of the side air guiding element 15. In place of a large main rocker arm 16, it is also possible, for example, to provide two main rocker arms 16 which are fitted with aligned articulation axes A and B.

The two auxiliary rocker arms 17 are each articulated in a front link 17a in a front articulation axis B to the left rear door 6 and in a rear link 17b in a rear articulation axis D to the side air guiding element 15. In the embodiment shown, two auxiliary rocker arms 17 are provided vertically one above the other with aligned links 17a in the common front articulation axis B and aligned links 17b in the common rear articulation axis D, wherein they are provided above and below the main rocker arm 16 in order to achieve good stabilization.

The main rocker arm 16 and the two auxiliary rocker arms 17 together form a four-bar coupling 18 with the four articulation axes A, B, C, D which consequently constitutes a forced guiding or clear guiding of the side air guiding element 15 when it is adjusted between the basic position of FIG. 1 and the travel position of FIG. 3. The main rocker arm 16 is in this instance constructed with a larger extent or active length than the two auxiliary rocker arms 17, that is to say, the spacing between the articulation axes A and C of the main rocker arm 16 is greater than the spacing between the articulation axes B and D of the auxiliary rocker arms 17. The following adjustment or adjustment movement is thereby achieved:

In the basic position of FIG. 1, the two auxiliary rocker arms 17 and the main rocker arm 16 are positioned flat on the closed rear door 6 which consequently extends in the YZ plane. The side air guiding element 15 is located flat on the rear door 6, the two auxiliary rocker arms 17 and the main rocker arm 16, that is to say, it is placed flat on the rocker arms 16, 17 so as to consequently extend in the YZ plane and consequently covers them partially, as can be seen in FIG. 1 and in the plan view of FIG. 6. In the subsequent pivoting-open operation, the articulation axis D describes a pivot movement through approximately 180° or slightly less than 180°. To this end, FIG. 6, 7, 8 show the adjustment of the right rear spoiler device 10, with the pivot movements of the side air guiding element 25, the main rocker arm 26 with the links 26a and 26b thereof and the auxiliary rocker arms 27 with the links 27a and 27b thereof.

Accordingly, the articulation axis D and consequently also the front end 15a, 25a of the side air guiding element 15, 25 is pivoted forward. The front end 15a, 25a of the side air guiding element 15, 25 consequently reaches a connection with respect to either the vehicle structure 2 or the side wall 3. In particular, a pivot movement is supported, in which the front end 15a, 25a laterally adjoins the vehicle structure 2 or the side wall 3 directly so that a flush, substantially edge-free transition is achieved for aerodynamic contour extension from the side wall 3 toward the rear. The side air guiding element 15, 25 extends in this instance in the travel position of FIGS. 3, 4 and 8 from the front end 15a, 25a thereof backward toward the center so that the rear end 15b, 25b thereof is offset in the transverse direction slightly toward the center of the vehicle so that the aerodynamic cross-section reduction is formed to prevent or to reduce break-away turbulence.

The main rocker arm 16, 26 consequently pivots about a smaller angle than the auxiliary rocker arms 17, 27.

The end position, that is to say, the basic position of FIG. 1 and the travel position of FIG. 3 and both travel positions according to FIG. 4 may in particular be secured by means of arresting or locking members 64, 65 which are fitted to the rear door 6 and which in particular can fix an auxiliary rocker arm 17 since the two auxiliary rocker arms 17 in both end positions, that is to say, the travel position and basic position, are positioned substantially flat on the rear door 6. Consequently, as a result of the four-bar coupling, a secure locking of the side air guiding element 15 and the rocker arms 16, 17 is achieved. Advantageously, the front end 15a of the side air guiding element 15 is additionally locked, that is to say, to the vehicle structure 2 or the side wall 3. In principle, however, such a locking is not required since the fixing by a locking member 65 to an auxiliary rocker arm 17 or both auxiliary rocker arms 17 is sufficient.

The left rear spoiler device 9 further has a roof air guiding element 35 which in the embodiment shown is articulated with the upper end 35a thereof in a folding axis E to the vehicle structure 2; the folding axis E consequently extends in the transverse direction Y and may in particular be constructed close to the upper end of the vehicle structure 2 so that the roof air guiding element 35 in the deployed position terminates substantially flush with the roof 4 and the upper portion of the vehicle structure 2. The roof air guiding element 35 pivots through less than 90°. Accordingly, the right rear spoiler device 10 has a roof air guiding element 36.

The adjustment movements of the side air guiding element 15, 25 and the roof air guiding element 35, 36 are coupled to each other by means of coupling devices 40, 44 according to different embodiments so that an adjustment of the side air guiding element 15, 25 independently brings about an adjustment of the roof air guiding element 35, 36. The left rear spoiler device 9 and the right rear spoiler device 10 can be adjusted separately from each other in this instance so that, for example, in FIG. 3 access to the right rear door 8 is provided when the left rear spoiler device 9 is installed.

According to FIG. 4, there is provided a secure coupling device 40 which consequently brings about a pressure-resistant and tension-resistant coupling between an upper edge 15c of the side air guiding element 15 and a lower side 35e of the left side air guiding element 35. The left and right coupling device 40 each have a coupling element 41 and a coupling receiving member 42, wherein the coupling element 41 is securely fitted to the upper edge 15c of the left side air guiding element 15 or the right side air guiding element 25 and extends in the coupling receiving member 42 at the lower side 35e or 36e of the roof air guiding element 35 or 36, respectively, so that the coupling receiving members 42 each reproduce the track or the path of the position of the coupling element 41 during the adjustment.

In accordance with the pivot operation of the respective side air guiding element 15, 25 and the folding operation or pivot operation about the fixed pivot axis E of the roof air guiding element 35, 36, there is accordingly produced a curved, for example, circular coupling receiving member 42, as can also be seen in the plan views of FIGS. 6 to 8.

In this instance, there is a clear guiding and coupling between the adjustment movement of the side air guiding element 15 and the roof air guiding element 35. During the installation movement of FIG. 1 and FIG. 3, there is a pressure load of the coupling element 41 in the coupling receiving member 42; during the return adjustment from FIG. 3 to FIG. 1, the roof air guiding element 35 pivots downward as a result of the inherent weight, wherein, in addition to the pressure load as a result of inherent weight, a tension-resistant coupling is in principle provided.

The coupling receiving member 42 may in particular be constructed as a rail, that is to say, in particular as a sliding guide, which, for example, secures the coupling element 41 at two sides, so that it describes a clear path.

Figure 5:
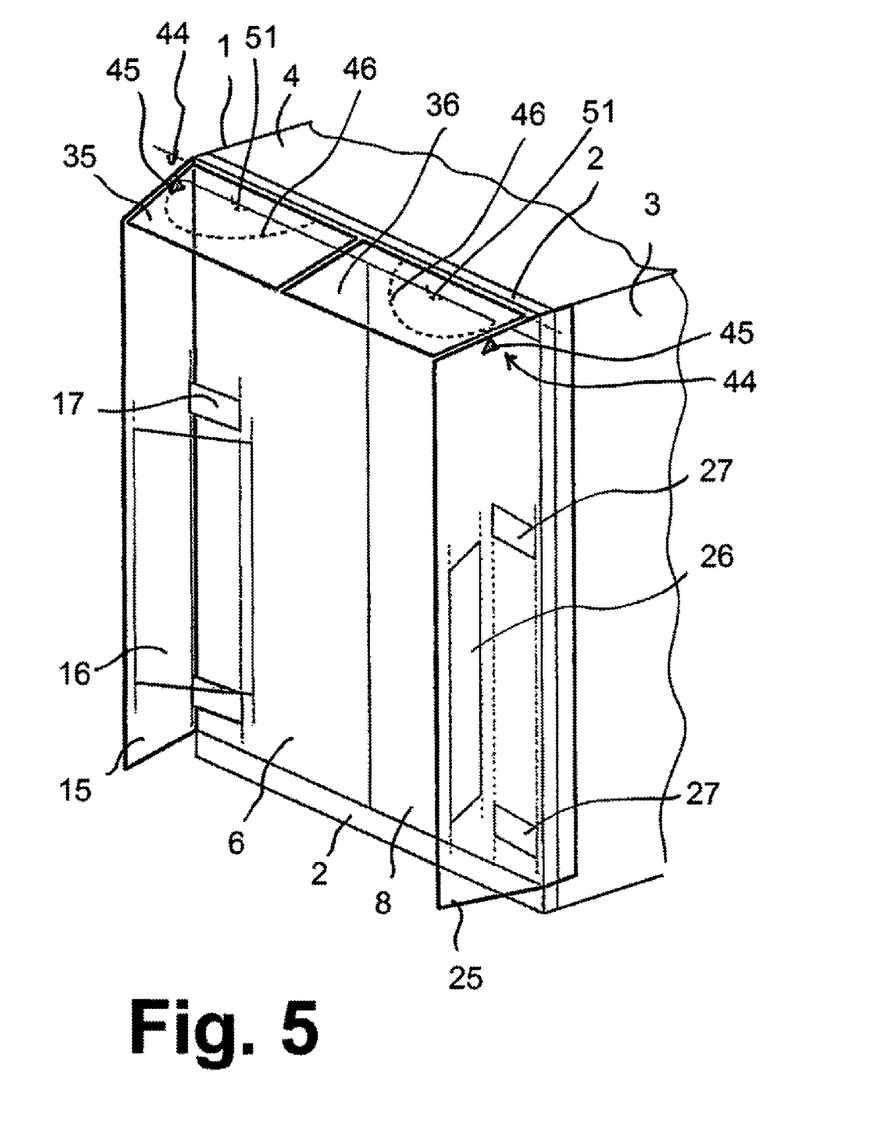
FIG. 5 shows the travel position in an alternative embodiment to FIG. 4 with coupling supported by gravitational force.

In the embodiment of FIG. 5, the roof air guiding element 35, 36 is positioned with the lower side 35e, 36e thereof on a support element 45 which is fitted to the upper edge 15c, 25c of the side air guiding element 15, 25 or is constructed as part of the side air guiding element 15, 25. Consequently, the coupling device 44 of FIG. 5 is constructed by the support element 45 and a sliding face 46 on the lower side 35e or 36e, wherein the sliding face 46 may be reinforced or is simply a portion of the lower side 35e or 36e of the roof air guiding element 35, 36. Consequently, there is a coupling supported by gravitational force between the roof air guiding element 35 and the side air guiding element 15, wherein where applicable a resilient device 51 which is provided between the roof air guiding element 35 and the rear door 6 additionally presses the respective roof air guiding element 35, 36 downward. During the installation operation of FIG. 1 to FIG. 3, the roof air guiding element 35 is consequently pressed upward counter to gravitational force. During adjustment back, it independently folds downward as a result of gravitational force.

In both embodiments, the user as a result of the four-bar coupling and the clear guiding or forced guiding of the side air guiding element 15, 25 can carry out the adjustment, for example, by hand. As a result of the low friction in the links of the four-bar coupling 18, and in particular as a result of the force reduction of the installation movement or the folding upward of the side air guiding element 35, 36 when the rear spoiler device 9 or 10 is deployed as a result of the great curve length of the coupling receiving member 42 or sliding face 46, the total application of force is small and can be carried out manually by a user. After unlocking the locking member 64, the user can consequently, for example, initially grasp the side air guiding element 15 and pivot it outward. In this instance, resilient devices 68 may be provided, for example, bi-stable resilient devices 68, which support the adjustments and which are pretensioned into the travel position and basic position. Consequently, the adjustment from the travel position and basic position is first carried out counter to the resilient action, until a dead center position has been passed, whereupon the adjustment into the other position is then supported by resilient force. With a single actuation operation, the rear spoiler device 9 or 10, that is to say, both the respective side air guiding element 35, 36 and the roof air guiding element 35, 36, is consequently adjusted into the travel position. The adjustment back from the travel position into the basic position is also carried out with a single actuation operation.

According to the embodiment of FIG. 4 with the tension-resistant and pressure-resistant coupling as a result of the coupling device 40 with the coupling element 41, a stabilization and locking of the roof air guiding element 35 is already possible; for example, struts may additionally be installed between the lower side 35*e* of the roof air guiding element 35 and the rear door 6. In the embodiment of FIG. 5, additional locking or securing of the roof air guiding element 35 may be carried out by means of a strut; in principle, however, the resilient device 51 is already sufficient.

From the basic position of FIG. 1, the user can also pivot the rear door 6 or 8 forward through substantially 270°. The rear spoiler device 9 or 10 adjoins the rear door 6 in a flat manner and is received in the pivoted-forward position between the rear door 6 and the side wall 3; the rear door 6 may in this instance be locked to the side wall 3 in a conventional manner.

While the above description constitutes the preferred embodiments of the present invention, it will be appreciated that the invention is susceptible to modification, variation and change without departing from the proper scope and fair meaning of the accompanying claims.

The invention claimed is:

1. A rear spoiler device for a vehicle having at least one rear door, the rear spoiler device having a basic position and a travel position, the rear spoiler device comprising:
   a side air guiding element configured for a first adjustment movement between the basic position and the travel position for contour extension and aerodynamic air guiding,
   a roof air guiding element configured for a second adjustment movement between the basic position and the travel position for contour extension and aerodynamic air guiding, and
   a coupling device for coupling the adjustment movements of the side air guiding element and the roof air guiding element,
   wherein the coupling device is disposed between a lower side of the roof air guiding element and an upper end of the side air guiding element, wherein the upper end of the side air guiding element is configured to be adjusted along the lower side of the roof air guiding element during the first and second adjustment movements,
   wherein the coupling device has a coupling element disposed on the upper end of the side air guiding element and a coupling receiving member constructed on the lower side of the roof air guiding element, wherein the coupling element is received and guided for the first and second adjustment movements.

2. The rear spoiler device as claimed in claim 1, wherein the upper end of the side air guiding element can be adjusted with respect to the lower side of the roof air guiding element with a curved path during the second adjustment movement.

3. The rear spoiler device as claimed in claim 2, wherein the curved path is a circular path.

4. The rear spoiler device as claimed in claim 1, wherein the coupling device is constructed for pressure-resistant and tension-resistant coupling between the roof air guiding element and the side air guiding element.

5. The rear spoiler device as claimed in claim 1, wherein the coupling receiving member is constructed as at least one of a rail and a sliding guide.

6. The rear spoiler device as claimed in claim 1, wherein the roof air guiding element is positioned with the lower side on the side air guiding element.

7. The rear spoiler device as claimed in claim 6, comprising a resilient device configured for resiliently pretensioning the roof air guiding element downward onto the side air guiding element.

8. The rear spoiler device as claimed in claim 1, further comprising an adjustment device, wherein the side air guiding element is guided by the adjustment device between the basic position and the travel position thereof.

9. The rear spoiler device as claimed in claim 8, wherein the adjustment device has a four-bar coupling with four articulation axes,
   further comprising at least one main rocker arm configured to be articulated to the rear door about a front articulation axis and to be articulated to the side air guiding element about a rear articulation axis, and
   at least one auxiliary rocker arm configured to be articulated to the rear door about a front articulation axis and configured to be articulated to the side air guiding element about a rear articulation axis,
   wherein the four articulation axes extend parallel to each other and are different.

10. The rear spoiler device as claimed in claim 9, wherein the auxiliary rocker arm has a first front link and the main rocker arm has a second front link, the first front link being closer to a side wall of the vehicle than the second front link,
   wherein the auxiliary rocker arm, during the first and second adjustment movements from the basic position into the travel position is configured to pivot through a larger pivot angle than the main rocker arm,
   wherein the side air guiding element has a front end constructed to pass through a pivot movement of the rear door toward the rear, laterally outward and forward during the first adjustment movement, wherein the front end of the side air guiding element in the travel position, adjoins at least one of the side wall and a lateral region of the vehicle.

11. The rear spoiler device as claimed in claim 9, wherein, in the basic position,
the auxiliary rocker arm and the main rocker arm are placed flat on the rear door,
the side air guiding element is placed flat on the auxiliary rocker arm, the main rocker arm, and the rear door, and
the roof air guiding element is placed flat on the side air guiding element for flat construction of the rear spoiler device.

12. The rear spoiler device as claimed in claim 1, wherein the roof air guiding element is articulated with respect to the rear door about a horizontal folding axis and, during the second adjustment movement, forms a folding movement from a vertical rest position through less than a right angle into the travel position with a rear end, wherein the rear end slopes in a backward direction.

13. The rear spoiler device as claimed in claim 1, wherein the rear spoiler device is configured to be fitted completely to the rear door.

14. The rear spoiler device as claimed in claim 13, wherein the rear spoiler device, in the basic position, when the rear door is folded forward, is received between the rear door and the side wall.

15. The rear spoiler device as claimed in claim 14, wherein the rear spoiler device is in a locked position between the rear door and the side wall.

16. The rear spoiler device as claimed in claim 1, wherein the roof air guiding element is positioned on a support element fitted to the side air guiding element in a state supported by gravitational force.

17. A rear spoiler arrangement for a vehicle, comprising a left rear spoiler device with a basic position and a travel position and a right rear spoiler device,
wherein each of the left rear spoiler device and the right rear spoiler device includes
a side air guiding element configured for a first adjustment movement between the basic position and the travel position for contour extension and aerodynamic air guiding,
a roof air guiding element configured for a second adjustment movement between the basic position and the travel position for contour extension and aerodynamic air guiding, and
a coupling device for coupling the first and second adjustment movements of the side air guiding element and the roof air guiding element,
wherein the coupling device is disposed between a lower side of the roof air guiding element and an upper end of the side air guiding element, wherein the upper end of the side air guiding element is configured to be adjusted along the lower side of the roof air guiding element during the first and second adjustment movements,
wherein the left rear spoiler device and the right rear spoiler device are configured to be adjusted independently of each other between the basic position and the travel position.

18. A vehicle comprising a rear spoiler arrangement having a left rear spoiler device and a right rear spoiler device, a roof, side walls, a vehicle structure and two rear doors pivoted outward,
wherein each of the left rear spoiler device and the right rear spoiler device includes
a side air guiding element configured for a first adjustment movement between the basic position and the travel position for contour extension and aerodynamic air guiding,
a roof air guiding element configured for a second adjustment movement between the basic position and the travel position for contour extension and aerodynamic air guiding, and
a coupling device for coupling the first and second adjustment movements of the side air guiding element and the roof air guiding element,
wherein the coupling device is disposed between a lower side of the roof air guiding element and an upper end of the side air guiding element, wherein the upper end of the side air guiding element is configured to be adjusted along the lower side of the roof air guiding element during the first and second adjustment movements, wherein the left rear spoiler device and the right rear spoiler device can be adjusted independently of each other between the basic position and the travel position,
wherein the left rear spoiler device and the right rear spoiler device are configured to be adjusted independently of each other between the basic position and the travel position,
wherein in the basic position of the left rear spoiler device and the right rear spoiler device, the rear doors are configured to be pivoted forward from a closed position through substantially 270° for abutment against and locking on the side walls.

* * * * *